United States Patent
Hirayama

(10) Patent No.: US 7,040,369 B2
(45) Date of Patent: May 9, 2006

(54) PNEUMATIC RADIAL TIRE

(75) Inventor: Michio Hirayama, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 11/060,793

(22) Filed: Feb. 18, 2005

(65) Prior Publication Data
US 2005/0211362 A1 Sep. 29, 2005

(30) Foreign Application Priority Data
Mar. 26, 2004 (JP) ............................. 2004-091826

(51) Int. Cl.
B60C 15/06 (2006.01)
B60C 15/00 (2006.01)
B60C 1/00 (2006.01)
(52) U.S. Cl. ...................................... 152/543; 152/547
(58) Field of Classification Search ................ 152/543, 152/547
See application file for complete search history.

(56) References Cited

U.S. PATENT DOCUMENTS 5,023,292 A * 6/1991 Hong et al. ............ 152/547 X
5,033,524 A 7/1991 Ohtsuka

FOREIGN PATENT DOCUMENTS

| EP | 0 422 605 A2 | 4/1991 |
| EP | 1 125 976 A1 | 8/2001 |
| JP | 1-159142 A | 6/1989 |
| JP | 7-315015 A | 12/1995 |
| JP | 9-302149 A | 11/1997 |
| JP | 2001010312 A * | 1/2001 |
| JP | 2001-226526 A | 8/2001 |
| JP | 2002-178724 A | 6/2002 |
| JP | 2004106796 A * | 4/2004 |

* cited by examiner

Primary Examiner—Adrienne C. Johnstone
(74) Attorney, Agent, or Firm—Birch, Stewart, Kolasch & Birch, LLP

(57) ABSTRACT

The present invention provides a pneumatic radial tire, in which rolling resistance is reduced and durability is improved without losing toe-chip resistance when assembling the rim. More specifically, the present invention relates to a pneumatic radial tire having a chafer comprising a rubber composition having complex modulus of 9 to 13 MPa measured under conditions of temperature of 70° C., frequency of 10 Hz and dynamic strain of ±2%, loss tangent of 0.08 to 0.11 and tensile elongation at break of at least 230% measured according to JIS-K6251.

4 Claims, 1 Drawing Sheet

PNEUMATIC RADIAL TIRE

BACKGROUND OF THE INVENTION

The present invention relates to a pneumatic radial tire.

In order to conserve the global environment, attempts are being made to make automobiles more fuel-efficient. Therefore, with respect to tires for automobiles, tires with low rolling resistance are desired and particularly, lower rolling resistance is desired for heavy load tires used for heavy load vehicles such as trucks and buses, which have large displacement volume and fuel consumption.

Rolling resistance of a tire is largely affected by energy loss, which accompanies repeated deformation while running. Consequently, in order to reduce rolling resistance, for example, a tire structure is suggested, in which the rubber for the tread, which has the highest contribution rate (about 34%) for reducing rolling resistance, is composed of two layers, the inner layer being made of compound rubber having small energy loss and the outer layer being made of compound rubber having excellent gripping performance.

However, while the tread contributes largely to reducing rolling resistance, the tread also contributes largely to abrasion resistance, performance on snow and performance on wet surfaces. Particularly, reduction of rolling resistance is often in antinomy with such running performance. Therefore, there is the problem that by reducing rolling resistance, running performance tends to be lost.

Attempts are being made to improve toe-chip resistance and bead durability by improving the tensile properties of chafer rubber positioned at the bead of heavy load tires (see JP-A-2001-226526). In addition, attempts are made to improve bead durability and reduce rolling resistance by improving the dynamic viscoelasticity of the sidewall packing rubber (see JP-A-2002-178724). However, these methods do not consider low heat generation in chafer rubber and have the problem that rolling resistance cannot be reduced further.

SUMMARY OF THE INVENTION

The object of the present invention is to provide a pneumatic radial tire, in which rolling resistance is reduced and durability is improved without losing toe-chip resistance when assembling the rim.

The present invention relates to a pneumatic radial tire having a chafer comprising a rubber composition which has complex modulus of 9 to 13 MPa measured under conditions of temperature of 70° C., frequency of 10 Hz and dynamic strain of ±2%, loss tangent of 0.08 to 0.11 and tensile elongation at break of at least 230% measured according to JIS-K6251.

The pneumatic radial tire preferably further has a sidewall packing comprising a rubber composition having elastic modulus at 100% elongation of 2.3 to 5 MPa measured according to JIS-K6251.

The pneumatic radial tire is preferably used for heavy load vehicles.

DETAILED DESCRIPTION

Figure 1:
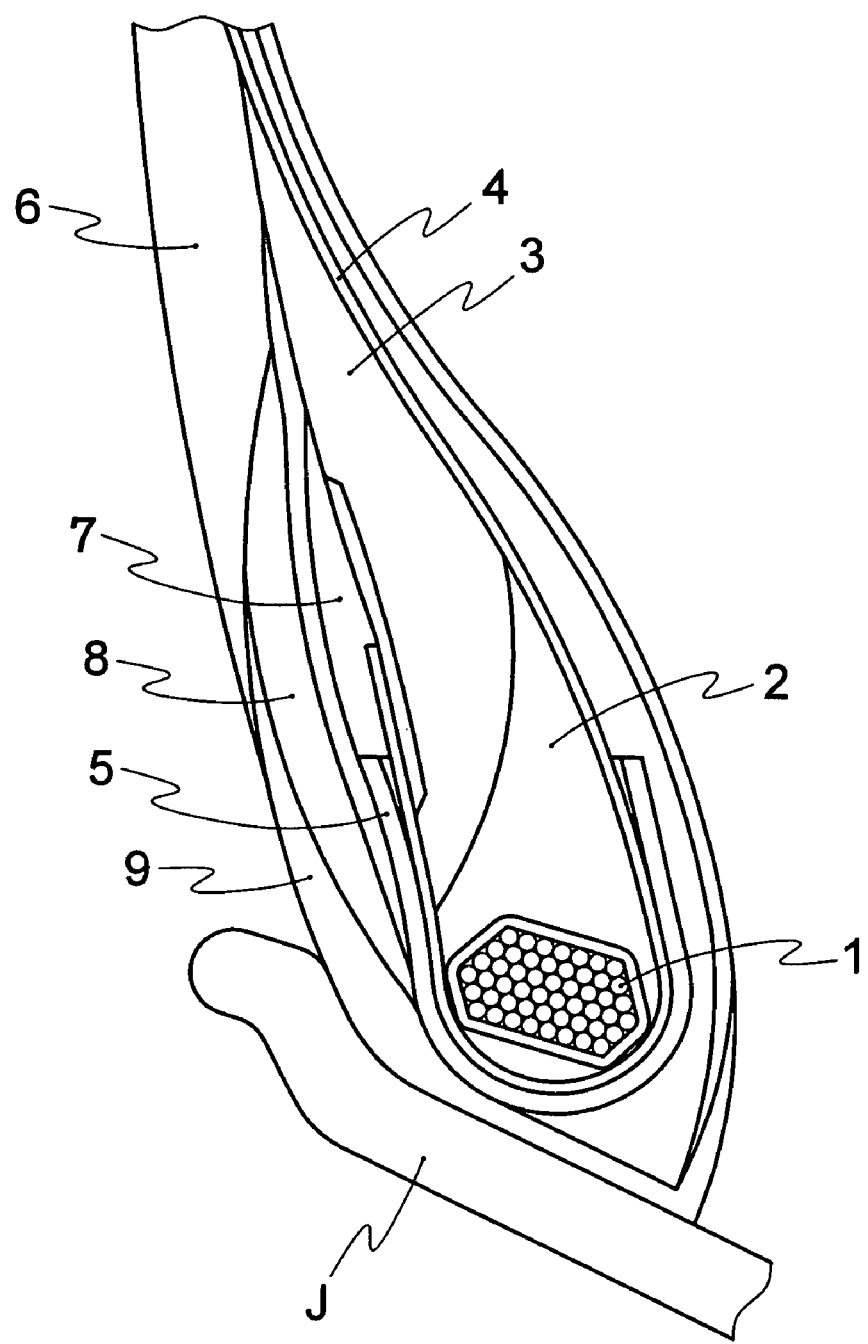
FIG. 1 is a cross-sectional view of the bead of a tire in one embodiment of the present invention.

FIG. 1 is a cross-sectional view of the bead of a tire in one embodiment of the present invention. The bead is composed of bead core 1; bead apex 2, which is tapered from the bead core toward the outside of the tire radius direction; sidewall packing 3, which is tapered from bead apex 2 toward the outside of the tire radius direction; carcass ply 4, which is folded around the bead core from the inside of the tire axial direction toward the outside; cord reinforcing layer 5, which surrounds carcass ply 4; outer sidewall 6, which forms the outer surface of the tire; ply edge cover 7, which is positioned at the inside of the tire axial direction between sidewall packing 3 and outer sidewall 6 and covers the outer end of the folded portion of carcass ply 4; inner sidewall 8, which is provided outside of ply edge cover 7; and chafer 9, which surrounds the area where the bead contacts with rim J to suitably protect the bead from contact friction with the rim.

According to the present invention, chafer 9 and sidewall packing 3 are composed of a specific rubber composition.

The chafer rubber composition of the present invention has complex modulus (E*) of at least 9 MPa, preferably at least 10 MPa measured under the conditions of temperature of 70° C., frequency of 10 Hz and dynamic strain of ±2%. When E* is less than 9 MPa, the binding force of the bead weakens and durability of the bead becomes poor. Also, E* is at most 13 MPa, preferably at most 12.5 MPa. When E* is more than 13 MPa, tensile elongation at break decreases and the toe tends to chip when assembling the rim. The above E* can be achieved by compounding 5 to 50 parts by weight of silica based on 100 parts by weight of a rubber component containing 40 to 70% by weight of polybutadiene rubber.

The chafer rubber composition of the present invention has loss tangent (tan δ) of at least 0.08, preferably at least 0.085 measured under the above conditions. When tan δ is less than 0.08, preventing decrease of tensile elongation at break while keeping the complex modulus in the above range is difficult. Also, tan δ is preferably at most 0.11, preferably at most 0.10. When tan δ is more than 0.11, rolling resistance cannot be reduced much. The above tan δ can be achieved by compounding 5 to 50 parts by weight of silica based on 100 parts by weight of a rubber component containing 40 to 70% by weight of polybutadiene rubber.

The chafer rubber composition of the present invention has tensile elongation at break of at least 230%, preferably at least 240% measured according to JKS-K6251. When the tensile elongation at break is less than 230%, toe-chip resistance becomes poor. The above tensile elongation at break can be achieved by compounding 5 to 50 parts by weight of silica based on 100 parts by weight of the rubber component containing 40 to 70% by weight of polybutadiene rubber.

The chafer rubber composition of the present invention preferably contains a blend of natural rubber and polybutadiene rubber as the rubber component and the amount of polybutadiene rubber in the rubber component is 40 to 70 parts by weight. This is because such a composition is suitable for achieving the above E* and tan δ while maintaining tensile elongation at break of at least 230%.

The chafer rubber composition of the present invention preferably further contains carbon black as a filler.

The nitrogen-adsorbing specific surface area ($N_2SA$) of the carbon black is preferably at least 60 $m^2/g$, more preferably at least 70 $m^2/g$. When $N_2SA$ is less than 60 $m^2/g$, elongation tends to decrease. In addition, $N_2SA$ is preferably at most 100 m$^2$/g, more preferably at most 90 m$^2$/g. When N$_2$SA is more than 100 m$^2$/g, low heat generating properties tend to become poor.

The content of the carbon black is preferably at least 30 parts by weight, more preferably at least 40 parts by weight, based on 100 parts by weight of the rubber component. When the carbon black content is less than 30 parts by weight, the rubber composition becomes soft and bead durability tends to decrease. Also, the content of carbon black is preferably at most 80 parts by weight, more preferably at most 70 parts by weight. When the content of carbon black is more than 80 parts by weight, low heat generating properties tend to become poor.

The chafer rubber composition of the present invention preferably further contains silica as a filler.

The content of silica is preferably at least 5 parts by weight, more preferably at least 10 parts by weight, based on 100 parts by weight of the rubber component. When the content of silica is less than 5 parts by weight, balance in hardness and elongation tends to become poor. Also, the content of silica is preferably at most 50 parts by weight, more preferably at most 45 parts by weight. When the content of silica is more than 50 parts by weight, abrasion caused by friction with the rim tends to become large.

Further, the chafer rubber composition of the present invention preferably contains a silane coupling agent together with the above silica.

An example of the coupling agent is Si266 available from Degussa Co.

The content of the silane coupling agent is preferably 3 to 20 parts by weight based on 100 parts by weight of the silica. When the content of the silane coupling agent is less than 3 parts by weight, decrease in viscosity of the kneaded rubber is insufficient and processing tends to become difficult. Also, when the content of the silane coupling agent is more than 20 parts by weight, costs tend to become high as the silane coupling agent is expensive.

Further, the chafer rubber composition of the present invention can contain sulfur as a vulcanizing agent.

The content of sulfur is preferably 1.2 to 3 parts by weight based on 100 parts by weight of the rubber component. When the content of sulfur is less than 1.2 parts by weight, deformation against compression tends to be large. Also, when the content of sulfur is more than 3 parts by weight, change in properties after aging tend to become large and toe-chip tends to occur.

Besides the above components, the chafer rubber composition of the present invention can contain compounding agents that are commonly used in a rubber composition for a tire such as oil, wax, an antioxidant and a vulcanization accelerator.

The sidewall packing rubber composition of the present invention preferably has complex modulus (M100) at 100% elongation of at least 2.3 MPa, more preferably at least 2.5 MPa measured according to JIS-K6251. When M100 is less than 2.3 MPa, bead durability tends to decrease. Also, M100 is more preferably at most 5 MPa. When M100 is more than 5 MPa, balance of hardness with the other members is lost and steering stability tends to decrease.

Further, the sidewall packing rubber composition of the present invention preferably has complex modulus (E*) of 3 to 6 MPa measured under the conditions of temperature of 70° C., frequency of 10 Hz and dynamic strain of ±2%. When E* is less than 3 MPa, durability tends to decrease. When E* is more than 6 MPa, running performance tends to decrease.

The sidewall packing rubber composition of the present invention can contain natural rubber (NR), polyisoprene rubber, polybutadiene rubber (BR) and styrene-butadiene copolymer rubber as the rubber component. Of these, NR is preferably used as the rubber component from the viewpoint that low heat generating properties are excellent.

The sidewall packing rubber composition of the present invention preferably further contains carbon black as a filler.

The nitrogen-adsorbing specific surface area (N$_2$SA) of the carbon black is preferably at least 20 m$^2$/g, more preferably at least 30 m$^2$/g. When N$_2$SA is less than 20 m$^2$/g, elongation decreases and tire durability tends to decrease. In addition, N$_2$SA is preferably at most 70 m$^2$/g, more preferably at most 60 m$^2$/g. When N$_2$SA is more than 70 m$^2$/g, low heat generating properties tend to become poor.

The content of the carbon black is preferably 30 to 60 parts by weight based on 100 parts by weight of the rubber component. When the content of the carbon black is less than 30 parts by weight, the rubber composition becomes soft and durability tends to decrease. When the content of the carbon black is more than 60 parts by weight, low heat generating properties tend to become poor.

The sidewall packing rubber composition of the present invention can further contain sulfur as a vulcanizing agent.

The content of the sulfur is preferably 2 to 4 parts by weight based on 100 parts by weight of the rubber component. When the content of sulfur is less than 2 parts by weight, the rubber composition becomes soft and durability tends to decrease. When the content is more than 4 parts by weight, the rubber composition becomes hard and running performance tends to decrease.

Besides the above components, the sidewall packing rubber composition of the present invention can contain a softening agents such as aromatic oil, vulcanization activators such as stearic acid and zinc oxide, vulcanization accelerators, antioxidants and fillers such as silica, aluminum hydroxide and talc.

The pneumatic radial tire of the present invention is prepared by the usual method using the chafer rubber composition and the sidewall packing rubber composition. That is, the rubber compositions obtained by mixing the above components are extruded into the chafer and the sidewall packing of a tire in an unvulcanized state and molded by the usual method on a tire molding machine to form an unvulcanized tire. Then, the unvulcanized tire is heated and pressurized in a vulcanizer to obtain a pneumatic radial tire.

The pneumatic radial tire of the present invention is used as a heavy load tire for heavy vehicles such as trucks and buses.

Hereinafter, the present invention is explained in detail by means of Examples, but the present invention is not limited thereto.

The materials used in Examples and Comparative Examples are shown below.

BR: VCR 412 available from Ube Industries, Ltd.
Carbon black 1: DIABLACK N220 (N$_2$SA: 113 m$^2$/g) available from Mitsubishi Chemical Corporation
Carbon black 2: DIABLACK N330 (N$_2$SA: 79 m$^2$/g) available from Mitsubishi Chemical Corporation
Carbon black 3: DIABLACK N550 (N$_2$SA: 42 m$^2$/g) available from Mitsubishi Chemical Corporation
Silica: Nipsil VN3 available from Nippon Silica Co., Ltd.
Silane coupling agent: Si266 available from Degussa Japan Co., Ltd.
Wax: SUNNOC Wax available from Ohuchi Shinko Chemical Industrial Co., Ltd.

Antioxidant: Ozonone 6C available from Seiko Chemical Co. Ltd.
Stearic acid: Kiri available from NOF Corporation
Zinc oxide: Ginrei R available from Toho Zinc Co., Ltd.
Aromatic oil: Diana Process oil AH24 available from Idemitsu Kosan Co., Ltd.
Sulfur: Sulfur available from Tsurumi Chemical Co., Ltd.
Vulcanization accelerator: Nocceler-NS (N-tert-butyl-2-benzothiazolylsulfenamide) available from Ohuchi Shinko Chemical Industrial Co., Ltd.

EXAMPLE 1 AND COMPARATIVE EXAMPLES 1 TO 6

The materials other than sulfur and the vulcanization accelerator were kneaded at 150° C. for 5 minutes using a Banbury mixer according to the composition shown in Table 1. Then, sulfur and the vulcanization accelerator were added thereto and kneading was conducted at 90° C. for 5 minutes using an open roll. The obtained kneaded article was formed into a chafer using a tire molding machine (chafer rubbers A to E).

TABLE 1

| Composition (parts by weight) | A | B | C | D | E |
|---|---|---|---|---|---|
| NR | 50 | 40 | 50 | 40 | 50 |
| BR | 50 | 60 | 50 | 60 | 50 |
| Carbon black 1 | — | 65 | 40 | 70 | — |
| Carbon black 2 | 50 | — | — | — | 60 |
| Silica | 10 | — | — | — | — |
| Silane coupling agent | 1 | — | — | — | — |
| Antioxidant | 3 | 3 | 3 | 3 | 3 |
| Stearic acid | 2 | 2 | 2 | 2 | 2 |
| Zinc oxide | 3 | 3 | 3 | 3 | 3 |
| Sulfur | 1.7 | 1 | 1.7 | 1.7 | 3 |
| Vulcanization accelerator | 2.5 | 2.5 | 2.5 | 2.5 | 2.5 |

The materials other than sulfur and the vulcanization accelerator were kneaded at 1 50° C. for 5 minutes using a Banbury mixer according to the composition shown in Table 2. Then, sulfur and the vulcanization accelerator were added thereto and kneading was conducted at 90° C. for 5 minutes using an open roll. The obtained article was formed into a sidewall packing using a tire molding machine (sidewall packing rubbers A' to C').

TABLE 2

| Composition (parts by weight) | A' | B' | C' |
|---|---|---|---|
| NR | 100 | 100 | 100 |
| Carbon black 1 | — | 50 | — |
| Carbon black 3 | 50 | — | 50 |
| Aromatic oil | — | 5 | 5 |
| Stearic acid | 2 | 2 | 2 |
| Zinc oxide | 6 | 6 | 6 |
| Sulfur | 2.5 | 2.5 | 4.5 |
| Vulcanization accelerator | 0.5 | 1 | 1 |

The chafer rubber and sidewall packing rubber obtained by the above method were used in the combinations shown in Table 3 to prepare a 11R22.514P.R. size radial tire for heavy load vehicles. The conditions for vulcanization of the tire were temperature of 150 ° C. and time of 35 minutes.
With respect to the sample tires, the following tests were conducted. The results were shown in Table 3.

(Test of Rubber Properties)

A strip sample of a width of 4 mm, length of 30 mm and thickness of 1.5 mm was clipped out respectively from the chafer and the sidewall of the sample tire. Then, the complex modulus (E*) and loss tangent (tan δ) of the sample were measured under the conditions of temperature of 70° C., frequency of 10 Hz and dynamic strain of ±2% using a viscoelasticity spectrometer available from Iwamoto Corporation.

Also, a sample was punched out from the chafer and the sidewall of the sample tire using a No. 3 dumbbell and the tensile test was conducted according to JIS-K6251 to measure the tensile elongation at break ($E_B$) of the sample.

(Rolling Resistance Test)

Each tire was attached to a regular rim (22.5×8.25, 15° drop center rim) and the rolling resistance of the tire was measured under the conditions of inner pressure of 700 kPa, speed of 80 km/h and load of 24.52 kN using a rolling resistance testing machine. The measured values were shown as an index based on Comparative Example 1 as 100 (standard). The smaller the index is the lower the rolling resistance, thus being favorable.

(Bead Durability Test)

The sample tire was attached to a regular rim (22.5×8.25, 15° drop center rim) at regular inner pressure (784 kPa). Then, the tire was run in a drum tester under the conditions of test load of 88 KN (three-times the standard maximum load) and test speed of 20 km/h. The distance at which the bead suffered visually recognizable damage was measured. The measured value was shown as an index based on Comparative Example 1 as 100 (standard). The larger the index is the better the bead durability.

(Running Performance Test)

The sample tire was attached to the front wheels of a 2-D.4 10 ton test vehicle and properties such as riding comfort, steering response, stiffness and grip were evaluated by sensory evaluation by the driver on a scale of 1 to 10 based on Comparative Example 1 as 6 (standard). The higher the rating is the better the running performance.

(Toe-Chip Resistance)

Rim assembling and rim releasing test of the sample tire to and from a 8.25×22.5 size aluminum wheel rim was conducted using a rim assembling machine (hydraulic tire changer) to examine presence of toe-chip. The aluminum wheel rim that was used had a worn-out flange with surface scraping. The bead of the sample tire was coated thinly in advance with lubricating paste, which was later wiped off with cloth.

(Overall Evaluation)

Overall evaluation of the sample tires were conducted according to the following criteria.
  ○: No toe-chip is observed and both rolling resistance and bead durability are improved.
  Δ: No toe-chip is observed and either rolling resistance or bead durability is improved.
  X: Toe-chip is observed.

TABLE 3

|  | Ex. | Com. Ex. | | | | | |
| --- | --- | --- | --- | --- | --- | --- | --- |
|  | 1 | 1 | 2 | 3 | 4 | 5 | 6 |
| Chafer rubber | A | B | C | D | E | A | A |
| Rubber properties | | | | | | | |
| $E^*$ | 10 | 12 | 8 | 14 | 11 | 10 | 10 |
| tan δ | 0.1 | 0.17 | 0.1 | 0.12 | 0.08 | 0.1 | 0.1 |
| $E_B$ (%) | 255 | 255 | 280 | 180 | 180 | 255 | 255 |
| Tire sidewall packing rubber | A' | B' | B' | B' | B' | B' | C' |
| Rubber properties | | | | | | | |
| $E^*$ | 4.4 | 4 | 4 | 4 | 4 | 4 | 6 |
| tan δ | 0.051 | 0.097 | 0.097 | 0.097 | 0.097 | 0.097 | 0.08 |
| M100 (MPa) | 3 | 2.2 | 2.2 | 2.2 | 2.2 | 2.2 | 6 |
| $E_B$ (%) | 430 | 505 | 505 | 505 | 505 | 505 | 250 |
| Test results | | | | | | | |
| Rolling resistance index | 94 | 100 | 95 | 96 | 94 | 95 | 95 |
| Bead durability index | 105 | 100 | 89 | 102 | 100 | 98 | 95 |
| Running performance | 6 | 6 | 6 | 6 | 6 | 6 | 5 |
| Toe-chip | None | None | None | Large | Large | None | None |
| Overall evaluation | ○ | Δ | Δ | x | x | Δ | Δ |

In Examples 1 in which chafer rubber A having $E^*$, tan δ and $E_B$ within the specified range was used, rolling resistance was reduced and durability was improved without losing toe-chip resistance when assembling the rim.

On the other hand, in Comparative Example 1 in which using chafer rubber B having large tan δ was used, rolling resistance was reduced. In Comparative Example 2 in which chafer rubber C having small $E^*$ was used, bead durability decreased. Also, in Comparative Examples 3 and 4 in which chafer rubbers D and E respectively having small $E_B$ are used, toe-chip resistance decreased.

According to the present invention, rolling resistance of a pneumatic radial tire can be reduced and durability can be improved without losing abrasion resistance, running performance such as performance on snow and performance on wet roads and toe-chip resistance when assembling the rim.

What is claimed is:

1. A pneumatic radial tire having a chafer comprising a rubber composition having complex modulus of 9 to 13 MPa measured under conditions of temperature of 70° C., frequency of 10 Hz and dynamic strain of ±2%, loss tangent of 0.08 to 0.11 and tensile elongation at break of at least 230% measured according to JIS-K6251.

2. The pneumatic radial tire of claim 1, further having a sidewall packing comprising a rubber composition having elastic modulus at 100% elongation of 2.3 to 5 MPa measured according to JIS-K6251.

3. The pneumatic radial tire of claim 1, which is used for a heavy load vehicle.

4. The pneumatic radial tire of claim 2, which is used for a heavy load vehicle.

* * * * *